(12) United States Patent
Kim et al.

(10) Patent No.: US 12,127,990 B2
(45) Date of Patent: Oct. 29, 2024

(54) GRAVITY COMPENSATOR APPLIED TO WEARABLE MUSCULAR STRENGTH ASSISTING APPARATUS

(71) Applicants: Hyundai Motor Company, Seoul (KR); Kia Motors Corporation, Seoul (KR)

(72) Inventors: Beom Su Kim, Gyeonggi-do (KR); Seok Ryung Kwon, Seoul (KR); Kyu Jung Kim, Seoul (KP); Hyun Seop Lim, Gyeonggi-do (KR); Ki Hyeon Bae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1109 days.

(21) Appl. No.: 16/994,767

(22) Filed: Aug. 17, 2020

(65) Prior Publication Data

US 2021/0275381 A1   Sep. 9, 2021

(30) Foreign Application Priority Data

Mar. 6, 2020   (KR) .......................... 10-2020-0028254

(51) Int. Cl.
*A61H 1/00*   (2006.01)
*A61H 1/02*   (2006.01)

(52) U.S. Cl.
CPC ... *A61H 1/0281* (2013.01); *A61H 2201/1671* (2013.01); *A61H 2201/1673* (2013.01)

(58) Field of Classification Search
None
See application file for complete search history.

(56) References Cited

U.S. PATENT DOCUMENTS

| 11,617,700 | B2* | 4/2023 | Park ..................... A61H 1/0288 |
| | | | 601/40 |
| 11,801,596 | B2* | 10/2023 | Moisè .................... B25J 9/0006 |
| 2017/0144309 | A1* | 5/2017 | Sankai .................... B25J 17/00 |
| 2019/0060155 | A1* | 2/2019 | Corrigan .............. A61H 1/0266 |
| 2020/0261298 | A1* | 8/2020 | Kim ......................... A61H 1/00 |
| 2022/0161415 | A1* | 5/2022 | Giovacchini ........ A61H 1/0281 |
| 2022/0228710 | A1* | 7/2022 | Asbeck ................... F16M 13/04 |

FOREIGN PATENT DOCUMENTS

KR   10-2012-0121278 A   11/2012

* cited by examiner

*Primary Examiner* — LaToya M Louis
(74) *Attorney, Agent, or Firm* — Fox Rothschild LLP

(57) ABSTRACT

A gravity compensator applied to a wearable muscular strength assisting apparatus includes a first link configured to extend parallel to a first body portion of a wearer, a second link configured to extend parallel to a second body portion and which is rotatably coupled to an end of the first link, an elastic body, which is fixed at an end thereof to the first link so as to exert an elastic force, which varies according to a length between the two ends thereof, and a connection unit, which is connected an end thereof to the other end of the elastic body and extends in a longitudinal direction of the first link and which is connected at an end thereof to the second link so as to vary a length of the elastic body by relative rotation between the first link and the second link.

11 Claims, 9 Drawing Sheets

GRAVITY COMPENSATOR APPLIED TO WEARABLE MUSCULAR STRENGTH ASSISTING APPARATUS

CROSS-REFERENCE TO RELATED APPLICATION

This application claims under 35 U.S.C. § 119(a) the benefit of Korean Patent Application No. 10-2020-0028254, filed on Mar. 6, 2020 in the Korean Intellectual Property Office, the entire contents of which are incorporated herein by reference.

BACKGROUND

1. Technical Field

The present disclosure relates to a gravity compensator applied to a wearable muscular strength assisting apparatus, more particularly, to the gravity compensator that is configured to be worn on an upper limb of a wearer's body and which simulates the motion of the wearer's shoulder to assist muscular strength of an upper limb.

2. Description of the Related Art

In general, a wearable robot, which assists motion of the wearer's body by being worn on a specific portion of the body or by accommodating a specific portion of the body, has been designed for medical purposes, military purposes or work assisting purposes. Particularly, a wearable working robot is designed to prevent injury to a wearer and to assist the wearer's muscular strength by reducing the load applied to the wearer's body. Such a wearable robot is constructed to simulate the wearer's outer body portion. In such a wearable robot, it is technically essential to design joints so as to implement the same motion as actual motion of a human body.

Particularly, a muscular strength assisting apparatus for a wearable upper arm typically includes a manual support apparatus configured to assist a human body supporting the load of a tool. For example, the manual support apparatus may be constructed so as to compensate for gravity within a positional range using a combination of components, springs, cables and pulleys. In particular, such an apparatus is constructed so as to compensate for gravity within a limited motion range.

A conventional gravity compensator includes a drive unit composed of a motor and a decelerator, which undesirably increases a volume and weight of the apparatus. As a result, there is a need to replace these components to address this problem.

Details described as the background art are intended merely for the purpose of promoting the understanding of the background of the present disclosure and should not be construed as an acknowledgment of the prior art that is previously known to those of ordinary skill in the art.

SUMMARY

Therefore, the present disclosure provides a gravity compensator applied to a wearable muscular strength assisting apparatus in which a motor and a decelerator, which are typically provided in a conventional gravity compensator, have been replaced with an elastic body and a wire in order to reduce manufacturing costs and weight.

In accordance with the present disclosure, the above and other objects can be accomplished by the provision of a gravity compensator applied to a wearable muscular strength assisting apparatus including a first link configured to extend in a direction parallel to a first body portion of a wearer, a second link configured to extend in a direction parallel to a second body portion rotatably connected to a first end of the first body portion of the wearer and which is rotatably coupled to a first end of the first link, an elastic body, which is fixed at a first end thereof to the first link so as to exert an elastic force, which varies according to a length between the first end and a second end thereof, and a connection unit, which is connected a first end thereof to the second end of the elastic body and extends in a longitudinal direction of the first link and which is connected at a second end thereof to the second link so as to vary a length of the elastic body by relative rotation between the first link and the second link.

The connection unit may include a first rotator, which is fixed to the second link at a location, at which the first link is coupled to the second link, and which is rotatably secured to the first link.

The connection unit may include a first wire, which is coupled at a first end thereof to the first rotator and extends in a longitudinal direction of the first link, a second rotator, which is connected to a second end of the first wire and is rotatably coupled to the first link, and a rotary link unit, which is fixed at a first end thereof to the second rotator and is coupled at a second end thereof to the second end of the elastic body so as to change the length of the elastic body and a direction in which the elastic force of the elastic body is exerted on the second rotator according to rotation of the second rotator.

The gravity compensator may further include a third wire, which is composed of a plurality of third wires and which is rotatably secured at a first end thereof to a drive motor mounted on the first link and is connected at a second end thereof to the second link, wherein the first rotator includes a first wire groove in which the first wire is received and engaged, and a second wire groove, which is spaced apart from the first wire groove in a radial direction of the first rotator and in which the third wire is received.

The rotary link unit may include a first rotary link, which is rotatably secured at a first end thereof to the second rotator and is rotated therewith, and a second rotary link, which is fixed at a first end thereof to the first link and is rotatably coupled at a second end thereof to a second end of the first rotary link, wherein the second end of the elastic body is rotatably coupled to the first rotary link.

The elastic body may include a plurality of elastic bodies, which are oriented in a direction perpendicular to the longitudinal direction of the first link, and the gravity compensator may further include an elastic-body link, which is coupled at a first end thereof to the second end of the elastic body and is rotatably coupled at a second end thereof to the first link.

A torque, which is applied to the second link by elastic force of the elastic body, may gradually increase and then decrease as the second link is rotated upwards with respect to the first link.

The second link may be rotatable in an up-and-down direction with respect to the first link, and is rotatable only between a first predetermined angle and a second predetermined angle, and the torque applied to the second link may be maximized at a third predetermined angle between the first predetermined angle and the second predetermined angle.

The first body portion may correspond to the wearer's shoulder, and the second body portion may correspond to an upper arm rotatably connected to the wearer shoulder.

The connection unit may include a second wire, which is coupled at a first end thereof to the first rotator and extends in the longitudinal direction of the first link and which is connected to the second end of the elastic body so as to be moved by rotation of the first rotator.

The connection unit may include a pulley, which is rotatably coupled to the second end of the elastic body and which is positioned between the first end and a second end of the second wire such that the second wire is wound around the pulley, and the second end of the second wire may extend in a reverse direction from a location at which the second wire is wound around the pulley, and may be fixed to the first link.

A torque, which is applied to the second link by elastic force of the elastic body, may gradually increase as the second link is rotated upwards with respect to the first link.

The first body portion may correspond to the wearer's upper arm, and the second body portion may correspond to a front arm rotatably connected to the wearer's upper arm.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
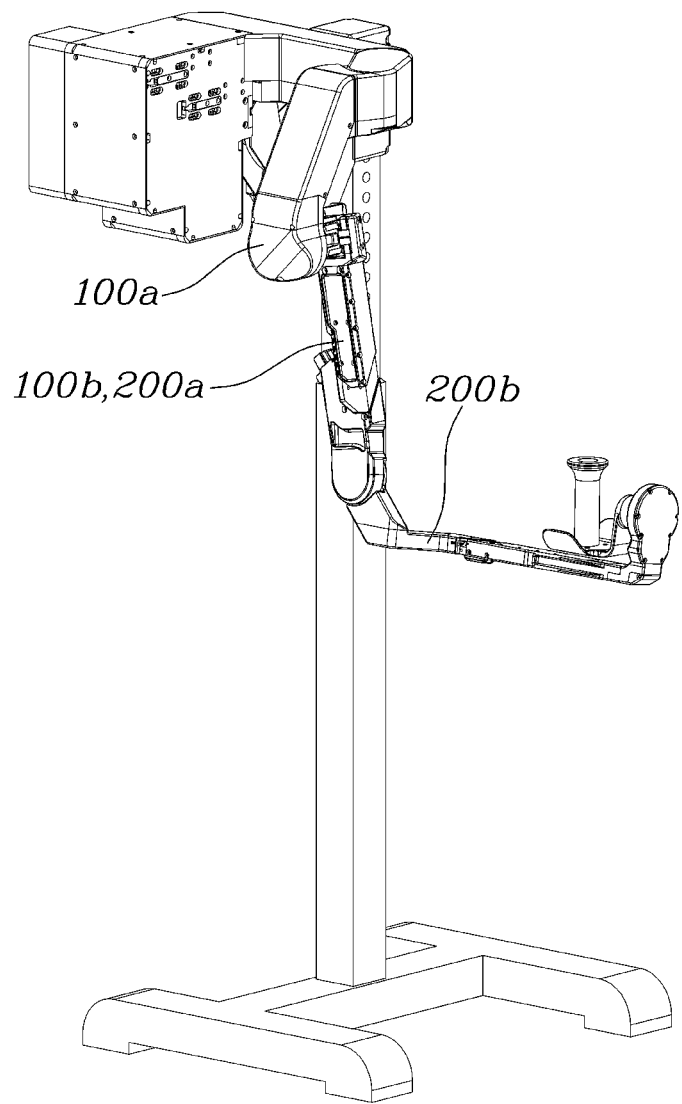
FIG. 1 is a perspective view of a wearable muscular strength assisting apparatus according to the present disclosure.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way.

Unless otherwise defined, all terms including technical and scientific terms used herein have the same meaning as those commonly understood by one of ordinary skill in the art to which this disclosure belongs. It will be further understood that terms, such as those defined in commonly used dictionaries, should be interpreted as having meanings consistent with their meaning in the context of the relevant art and the present disclosure, and are not to be interpreted in an idealized or overly formal sense unless expressly so defined herein.

Hereinafter, exemplary embodiments of the present disclosure will be described in detail with reference to the accompanying drawings. Throughout the drawings, the same reference numerals will refer to the same or like parts.

Figure 2:
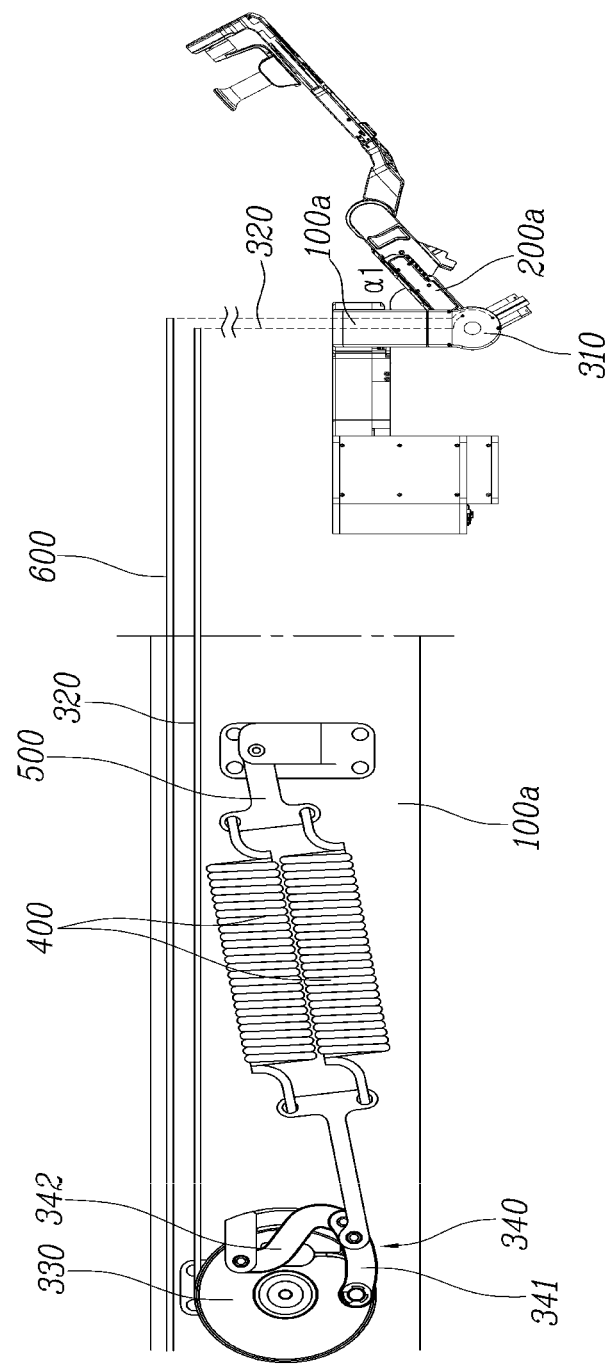
FIGS. 2 and 3 are side views of a first embodiment of a gravity compensator applied to the wearable muscular strength assisting apparatus according to the present disclosure.
Figure 3:
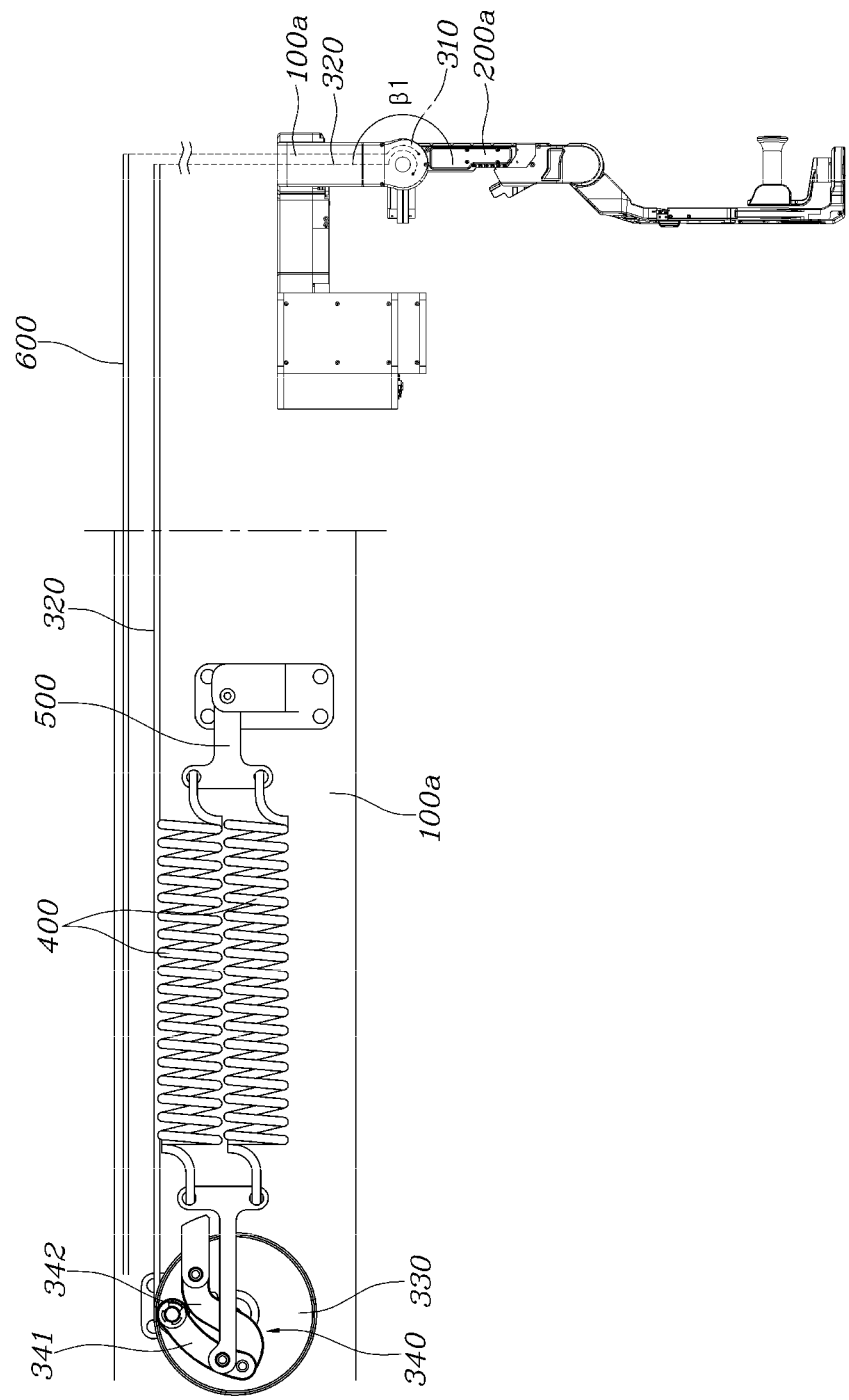
Figure 4:
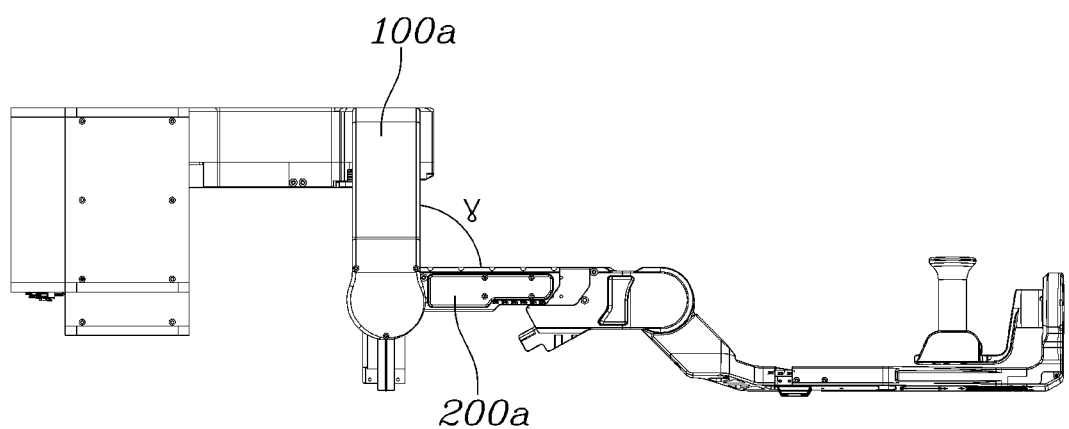
FIG. 4 is a side view of the first embodiment of the gravity compensator applied to the wearable muscular strength assisting apparatus according to the present disclosure, in which the torque applied during rotation of a second link is maximized.
Figure 5:
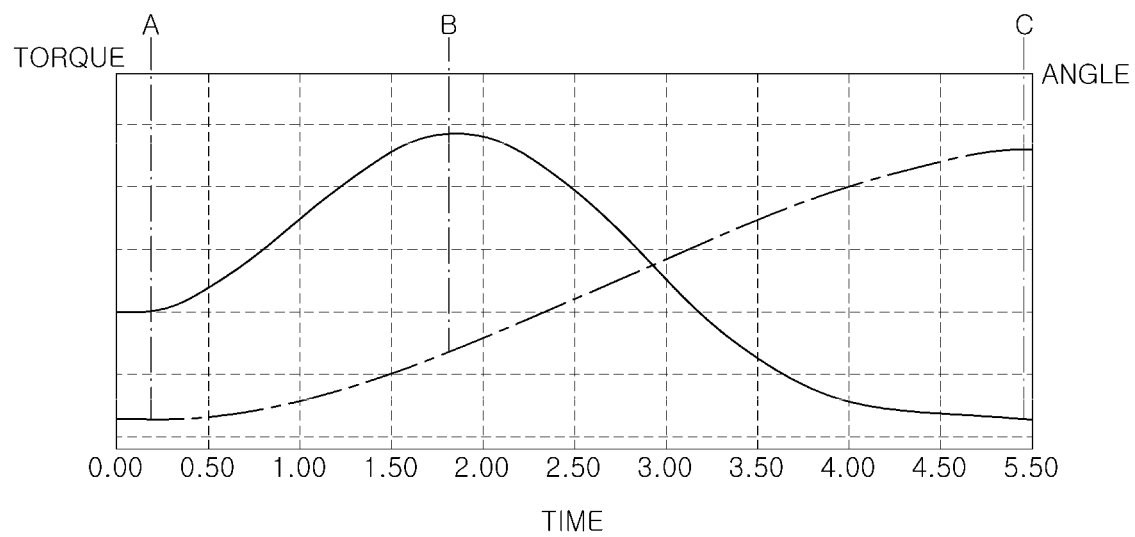
FIG. 5 is a graph illustrating the torque, which is applied against gravity during rotation of the second link, with an angle of the second link, in the first embodiment of the gravity compensator applied to the wearable muscular strength assisting apparatus according to the present disclosure.
Figure 6:
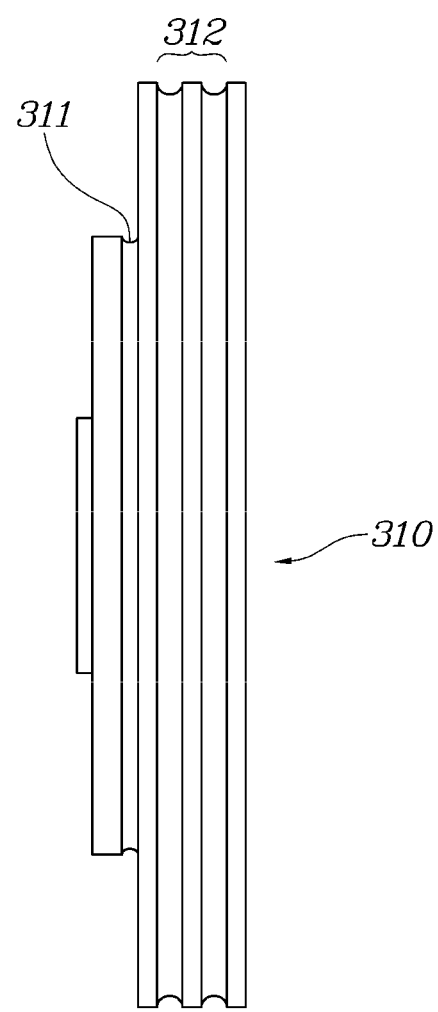
FIG. 6 is a front view of a first rotator of the gravity compensator applied to the wearable muscular strength assisting apparatus according to the present disclosure.
Figure 7:
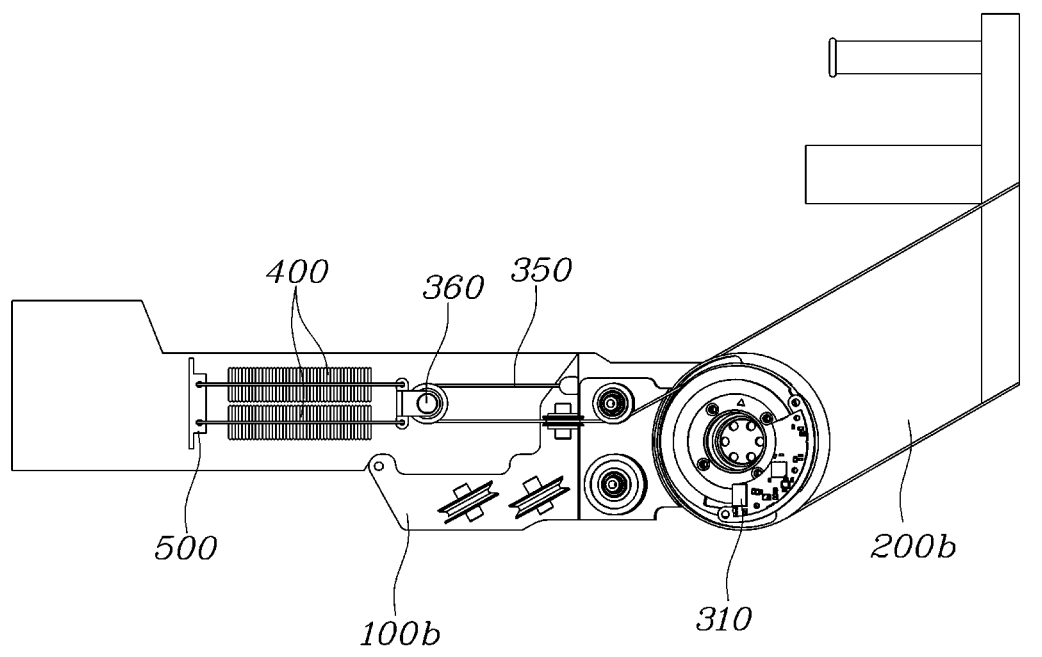
FIG. 7 is a side view of a second embodiment of the gravity compensator applied to the wearable muscular strength assisting apparatus according to the present disclosure.
Figure 8:
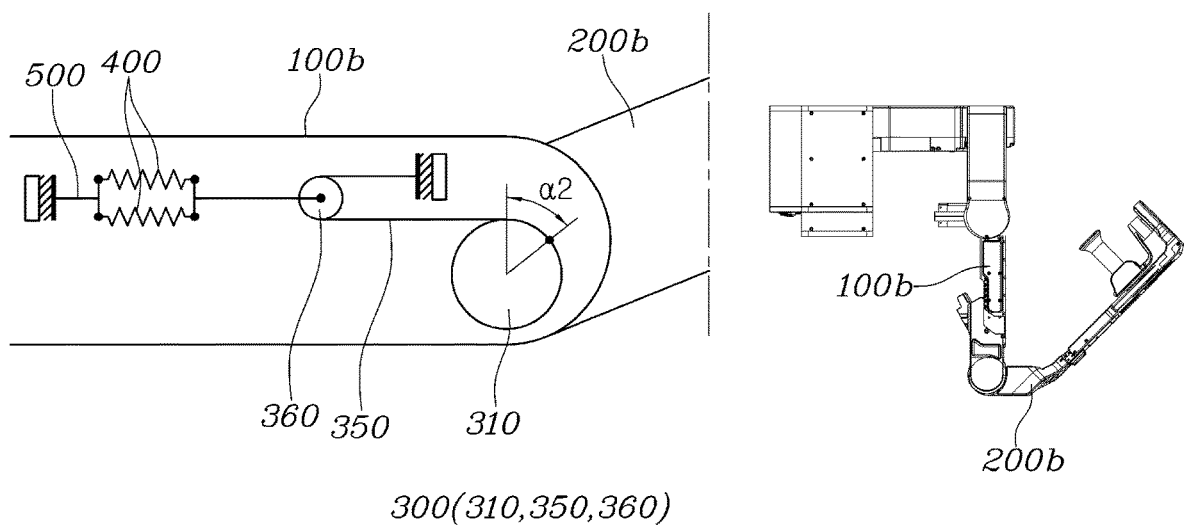
FIGS. 8 and 9 are side views illustrating the second embodiment of the gravity compensator applied to the wearable muscular strength assisting apparatus according to the present disclosure by means of reference numerals.
Figure 9:
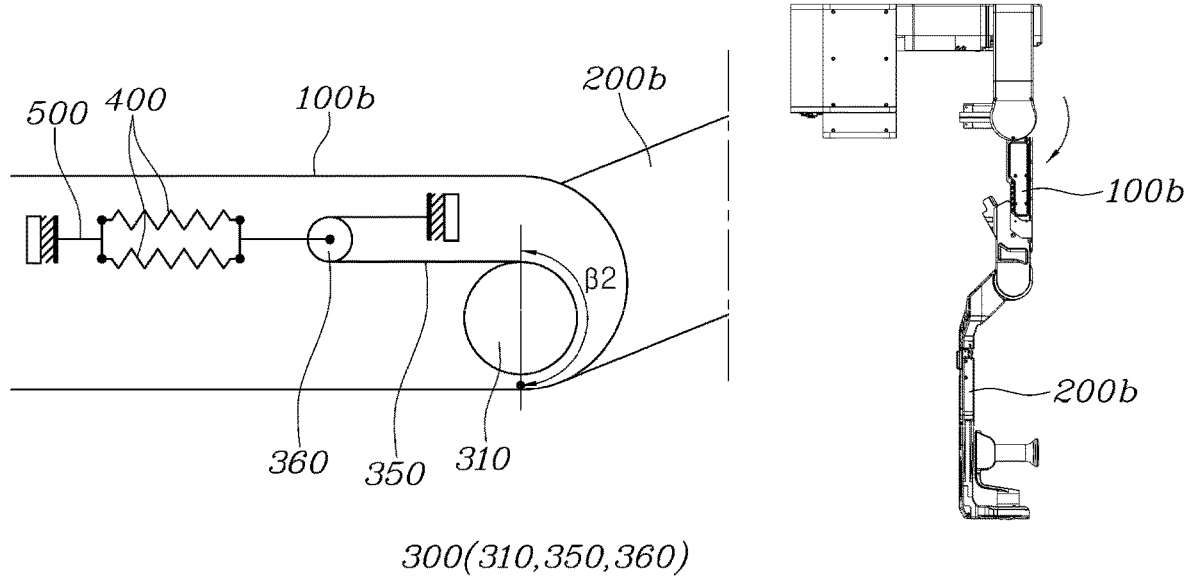

FIG. 1 is a perspective view of a wearable muscular strength assisting apparatus 1 according to the present disclosure. FIGS. 2 and 3 are side views of a first embodiment of a gravity compensator applied to the wearable muscular strength assisting apparatus 1 according to the present disclosure. FIG. 4 is a side view of the first embodiment of the gravity compensator applied to the wearable muscular strength assisting apparatus 1 according to the present disclosure, in which the torque applied during rotation of a second link is maximized. FIG. 5 is a graph illustrating the torque, which is applied against gravity during rotation of the second link, with an angle of the second link, in the first embodiment of the gravity compensator applied to the wearable muscular strength assisting apparatus 1 according to the present disclosure. FIG. 6 is a front view of a first rotator of the gravity compensator applied to the wearable muscular strength assisting apparatus 1 according to the present disclosure. FIG. 7 is a side view of a second embodiment of the gravity compensator applied to the wearable muscular strength assisting apparatus 1 according to the present disclosure. FIGS. 8 and 9 are side views illustrating the second embodiment of the gravity compensator applied to the wearable muscular strength assisting apparatus 1 according to the present disclosure by means of reference numerals.

Hereinafter, the gravity compensator applied to the wearable muscular strength assisting apparatus 1 according to preferred embodiments of the present disclosure will be described with reference to FIGS. 1 to 9.

The gravity compensator applied to the wearable muscular strength assisting apparatus 1 according to the present disclosure may include a first embodiment which is mounted on an external body portion of a joint region at which an upper arm is moved with respect to a wearer's shoulder and a second embodiment which is mounted on an external body portion of a joint region at which a front arm is moved with respect to the wearer's upper arm. In the case of the embodiment of the present disclosure, "a first end" and "a second end" represents a case where "a first side" and "a second side" are applied, respectively. And the link is a concept that includes not only a simple connection structure, but also a member or a bar of the apparatus.

The gravity compensator applied to the wearable muscular strength assisting apparatus 1 according to the present disclosure includes a first link 100a, 100b, which is configured to extend in a direction parallel to a first body portion of the wearer, a second link 200a, 200b, which is configured to extend in a direction parallel to a second body portion rotatably connected to one end of the first body portion and which is rotatably coupled to one end of the first link 100a, 100b, an elastic body 400, which is secured at one end thereof to the first link 100a, 100b and which varies in elastic force according to variation of the length between the one end and the other end thereof, and a connection unit 300, which is connected at one end thereof to the other end of the elastic body 400 and extends in a longitudinal direction of the first link 100a, 100b and which is connected at the other end thereof to the second link 200a, 200b and varies the length of the elastic body 400 according to relative rotation between the first link 100a, 100b and the second link 200a, 200b.

In the first embodiment of the present disclosure, the first body portion may correspond to the wearer's shoulder, and the second body portion may correspond to the wearer's upper arm. In the second embodiment, the first body portion may correspond to the wearer's upper arm, and the second body portion may correspond to the wearer's front arm.

Since the second link 200a, 200b is rotatably coupled to the one end of the first link 100a, 100b, the second link 200a, 200b is rotatable with respect to the first link 100a, 100b.

The one end of the elastic body 400 is secured to the first link 100a, 100b as the reference, and the other end of the elastic body 400 is coupled to the one end of the connection unit 300. The connection unit 300 is coupled the other end thereof to the second link 200a, 200b, which is rotatable. The connection unit 300 varies the length of the elastic body 400 according to the rotary angle of the second link 200a, 200b such that, when the second link 200a, 200b, which is positioned under the first link 100a, 100b, is rotated upwards, the length of the elastic body 400 is reduced so as to generate a torque in the direction opposite to a direction of a torque generated by gravity to compensate for the gravity, thereby assisting muscular strength of a wearer who is wearing the wearable muscular strength assisting apparatus 1.

The connection unit 300 includes a first rotator 310, which is secured to the second link 200a, 200b at the location at which the first link 100a, 100b is coupled to the second link 200a, 200b, and which is rotatably coupled to the first link 100a, 100b.

Since the connection unit 300 includes the first rotator 310, which is fixedly coupled to the second link 200a, 200b so as to be rotated together with the second link 200a, 200b when the second link 200a, 200b is rotated, it is possible to compensate for the torque generated at the second link 200a, 200b by gravity by transmitting elastic force of the elastic body 400, connected to the other end of the connection unit 300, to the second link 200a, 200b.

The first rotator 310 may be configured to have a circular shape, and may be coupled on the same rotary axis as the axis at which the second link 200a, 200b is coupled.

The elastic body 400, which may include a plurality of elastic bodies, include an elastic-body link 500, which is disposed in a direction perpendicular to the longitudinal direction of the first link 100a, 100b and which is coupled at one end thereof to the other end of the elastic body 400 and is rotatably coupled at the other end thereof to the first link 100a, 100b.

The elastic body 400 may be made of an object, such as a spring, having elastic force, and may include a plurality of elastic bodies, which are disposed in a direction perpendicular to the first link 100a, 100b. Since the elastic body 400 is composed of a plurality of elastic bodies, it is possible to transmit great elastic force even when the angular displacement of the first rotator 310 and the second rotator 330 is small. Furthermore, it is possible to advantageously adjust elastic force applied to the second link 200a, 200b by adjusting the number of elastic bodies 400.

Next, description regarding the first embodiment will be provided.

In the first embodiment of the present disclosure, the first body portion corresponds to the wearer's shoulder, and second body portion corresponds to the upper arm, which is rotatably connected to the wearer shoulder.

Consequently, when the wearer tries to rotate his/her upper arm upwards, it is possible to assist the muscular strength of the wearer's upper limb by compensating for the torque generated at the upper arm due to gravity using the elastic force of the elastic body 400 connected to the second link 200a, 200b.

The connection unit 300 includes a first wire 320, which is coupled at one end thereof to the first rotator 310 and which extends in the longitudinal direction of the first link 100a, the second rotator 330, which is connected to the other end of the first wire 320 and which is rotatably coupled to the first link 100a, 100b, and a rotary link unit 340, which is fixed at one end thereof to the second rotator 330 and which is coupled to the other end thereof to the elastic body 400 so as to change the length of the elastic body 400 and the direction of elastic force of the elastic body 400 acting on the second rotator 330 according to rotation of the second rotator 330.

The first wire 320, the second rotator 330 and the rotary link unit 340 may be applied to the first embodiment of the present disclosure.

The first wire 320 is fixed at the one end thereof to the first rotator 310 and at the other end thereof to the second rotator 330. Each of the first rotator 310 and the second rotator 330 may be provided in the outer peripheral surface thereof with a groove such that the first wire 320 is received in and engaged with the groove in the first rotator 310 and the groove in the second rotator 330. Accordingly, when the first rotator 310 is rotated and thus the first wired 320 is wound around the groove, the first wire 320, which has been wound around the second rotator 330, is unwounded from the second rotator 330. Meanwhile, when the first wire 320 is unwound from the first rotator 310 by rotation of the first rotator 310, the first wire 320 is wound around the second rotator 330.

The rotary link unit 340 is rotatably connected the one end thereof to the second rotator 330 and is connected at the other end thereof to the elastic body 400. Consequently, it is convert the elastic force of the elastic body 400 into the torque of the second rotator 330, and it is possible to transmit the torque of the second rotator 330 to the first rotator 310 via the first wire 320.

Accordingly, the elastic force of the elastic body 400 is converted into the torque of the second rotator 330 via the rotary link unit 340, and the torque, transmitted to the first rotator 310, compensates for the torque generated at the second link 200a by gravity, thereby assisting muscular force of the wearer's upper limb.

The gravity compensator further includes a third wire 600, which is connected at one end thereof to a drive motor mounted on the first link 100a, 100b and at the other end thereof to the second link 200a, 200b so as to cause the first link 100a, 100b to be relatively rotated with respect to the second link 200a, 200b, where the third wire 600 preferably is composed of a plurality of third wires. The first rotator 310 includes a first wire groove in which the first wire 320 is received and engaged, and a second wire groove 312, which is formed so as to be spaced apart from the first wire groove 311 in a radial direction of the first rotator 310 and in which the third wire 600 is received.

The third wire 600 is connected at one end thereof to the drive motor (not shown) mounted on the first link 100a, 100b and at the other end to the second link 200a, 200b. Activation of the drive motor (not shown) may move the third wire 600, thereby causing the first link 100a, 100b and the second link 200a, 200b to be relatively rotated with respect to each other.

The third wire 600 may be composed of a plurality of third wires 600. For example, the third wire 600 may be composed of two third wires 600 such that the first link 100a, 100b and the second link 200a, 200b are relatively rotated with respect to each other.

Referring to FIG. 6, the first rotator 310 may be provided with the first wire groove 311 in which the first wire 320 is received and engaged so as to rotate the first rotator 310.

The first rotator 310 may be provided with the second wire grooves 312, which are radially spaced apart from the first wire groove 311 and in which the plurality of third wires 600 are received. When the drive motor moves the third wires 600 to cause the first link 100a, 100b and the second link 200a, 200b to be relatively rotated, the third wires 600 received in the second wire grooves 312 may be moved so as to rotate the first rotator 310.

This may be applied to both the first and second embodiments of the present disclosure. In the second embodiment, a second wire 350 may be received in the first wire groove 311.

The rotary link unit 340 includes a first rotary link 341, which is rotatably secured at one end thereof to the second rotator 330 so as to be rotated therewith, and a second rotary link 342, which is fixed at one end thereof to the first link 100a and is rotatably secured at the other end thereof to the other end of the first rotary link 341. The other end of the elastic body 400 may be rotatably coupled to the first rotary link 341.

When the one end of the first rotary link 341 is connected to the second rotator 330 and the one end of the second rotary link 342 is fixedly coupled to the first link 100a, the other end of the first rotary link 341 and the other end of the second rotary link 342 are rotatably connected to each other. The other end of the elastic body 400 may be rotatably coupled to the first rotary link 341. The first rotary link 341 may convert the elastic force of the elastic body 400 into a torque.

Referring to FIG. 5, the torque generated at the second link 200a is maximized at a third predetermined angle (γ) shown in FIG. 4. At this time, the second rotary link 342 may convert the elastic force of the elastic body 400 into the torque of the second rotator 330 at the third predetermined angle (γ).

Since the elastic-body link 500 is connected at the one end thereof to the one end of the elastic body 400 and is rotatably connected at the other end thereof to the first link 100a, the elastic-body link 500 is rotated so as to be linearly aligned with the elastic body 400 according to rotation of the rotary link unit 340 connected to the other end of the elastic body 400, thereby enabling the elastic body 400 to normally exert the elastic force.

As the second link 200a is rotated upwards with respect to the first link 100a, the torque, which is applied to the second link 200a by the elastic force of the elastic body 400, gradually increases and then decreases.

Referring again to FIG. 5, there is shown the graph illustrating torque generated at the second link 200a due to gravity with the angle of the second link 200a with respect to the first link 100a. In FIG. 5, point A is the point at which the angle between the first link 100a and the second link 200a is a first predetermined angle (a), point C is the point at which the angle between the first link 100a and the second link 200a is a second predetermined angle (B), and point B is the point at which the angle between the first link 100a and the second link 200a is a third predetermined angle (Y). As appreciated from this, the torque, which is applied to the second link 200a due to the elastic force of the elastic body 400, varies according to the angle of the second link 200a, and the elastic force of the elastic body 400 is converted into a torque and is varied according to rotation of the second link 200a.

The second link 200a is rotatable in an up-and-down direction with respect to the first link 100a between the first predetermined angle and the second predetermined angle, and the torque applied to the second link 200a has the maximum value at the third predetermined angle between the first predetermined angle and the second predetermined angle.

FIG. 5 is the graph illustrating the torque, which is generated at the second link 200a due to gravity, with the rotary angle of the second link 200a with respect to the first link 100a. Since the included angle between the first link 100a and the second link 200a at the point B is the third predetermined angle (Y), the torque, which is generated at the second link 200a due to gravity, is maximized. Accordingly, the elastic force, which is exerted on the second link 200a by the elastic body 400 connected to the rotary link unit 340, is maximized at the third predetermined angle (Y).

In the second embodiment of the present disclosure, the first body portion may correspond to the wearer's upper arm, and the second body portion may correspond to the wearer's front arm. Accordingly, the second embodiment may be applied to compensate for the torque, which is generated at the wearer front arm due to gravity when the wearer rotates his/her front arm upwards with respect to his/her upper arm.

The connection unit 300 includes a second wire 350, which is coupled one end thereof to the first rotator 310 and extends in the longitudinal direction of the first link 100a and which is connected at the other end to an elastic body 400 and is moved by rotation of the first rotator 310.

In the second embodiment of the present disclosure, the one end of the second wire 350 is connected to the first rotator 310, and the other end of the second wire 350 is connected to the elastic body 400. As the first rotator 310 is rotated, the second wired 350 is wound around the first rotator 310, and thus the elastic body 400 is extended. Here, as the rotary angle of the first rotator 310 increases, the elastic force of the elastic body 400 also increases. Accordingly, the elastic force of the elastic body 400 increases in proportion to increase in the rotary angle of the second link 200b.

The connection unit 300 includes a pulley 360, which is rotatably coupled to the other end of the elastic body 400 and which is positioned between the one end and the other end of the second wire 350 such that the second wire 350 is wound around the pulley 360. The other end of the second wire 350 extends in the reverse direction from the pulley 360 around which the second wire 350 is wound, and is fixed to the first link 100b.

The other end of the elastic body 400 may be coupled to the pulley 360, and the second wire 350 may extend in the direction opposite to the direction in which the second wire 350 is connected to the pulley 360 and may be connected at the other end to the first link 100b.

Consequently, by virtue of the pulley 360, it is possible to connect the first rotator 310 to the elastic body 400 and to transmit the elastic force of the elastic body 400 to the first rotator 310 at a distance as large as the half of the entire length of the second wire 350.

The second wire 350, which connects the first rotator 310 to the pulley 360, may be provided with a sheave, which is positioned between the first rotator 310 and the pulley 360 so as to prevent movement of the second wire 350 in a direction perpendicular to the longitudinal direction of the second wire 350 while supporting the second wire 350. Accordingly, it is possible to make the second wire 350 stable.

The torque, which is applied to the second link 200a by the elastic force of the elastic body 400, gradually increases as the second link 200b is rotated upwards with respect to the first link 100b.

The elastic body 400 is connected to the first rotator 310 via only the second wire 350 and the pulley 360 such that the elastic force of the elastic body 400 increases or decreases as the first rotator 310 is rotated. Consequently, when the second link 200b is rotated upwards, the length of the elastic body 400 increases according to the rotary angle of the second link 200b. Therefore, since the elastic force of the elastic body 400 increases according to the rotary angle of the second link 200b, it is possible to assist the muscular strength of a wearer when the wearer raises his/her front arm upwards.

As is apparent from the above description, the present disclosure provides a gravity compensator applied to a wearable muscular strength assisting apparatus, which is composed of cables, drums, elastic bodies and links and which is capable of assisting muscular strength of the wearer's upper limb. The gravity compensator is capable of compensating for the torque caused by gravity when the wearer raises his/her upper arm and/or front arm. Furthermore, since the gravity compensator is constituted by the cables, the drums, the elastic bodies and the links rather than a motor and a decelerator, there is an effect of reducing manufacturing costs and weight.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A gravity compensator applied to a wearable muscular strength assisting apparatus, the gravity compensator comprising:
   a first link configured to extend in a direction parallel to a first body portion of a wearer;
   a second link configured to extend in a direction parallel to a second body portion of the wearer, the second link being rotatably connected to a first side of the first body portion of the wearer and which is rotatably coupled to a first side of the first link;
   an elastic body, having a first side fixed to the first link and an elastic force varying according to a change in length between the first side and a second side; and
   a connection unit, having a first side connected to the second side of the elastic body, which extends along a longitudinal direction of the first link, and having a second side connected to the second link to vary the length of the elastic body by relative rotation of the first link and the second link,
   wherein the connection unit includes:
   a first rotator, which is fixed to the second link at a location, at which the first link is coupled to the second link, and which is rotatably secured to the first link;
   a first wire, which is coupled at a first side thereof to the first rotator and extends in the longitudinal direction of the first link;
   a second rotator, which is connected to a second side of the first wire and is rotatably coupled to the first link; and a rotary link unit, which is fixed at a first side thereof to the second rotator and is coupled at a second side thereof to the second side of the elastic body so as to change the length of the elastic body and a direction in which the elastic force of the elastic body is exerted on the second rotator according to rotation of the second rotator.

2. The gravity compensator according to claim 1, further comprising a third wire which is rotatably secured at a first side thereof to a drive motor mounted on the first link and is connected at a second side thereof to the second link, wherein the first rotator includes:

a first wire groove in which the first wire is received and engaged; and a second wire groove, which is spaced apart from the first wire groove in a radial direction of the first rotator and in which the third wire is received.

3. The gravity compensator according to claim 1, wherein the rotary link unit includes:

a first rotary link, which is rotatably secured at a first side thereof to the second rotator and is rotated therewith; and a second rotary link, which is fixed at a first side thereof to the first link and is rotatably coupled at a second side thereof to a second side of the first rotary link, and wherein the second side of the elastic body is rotatably coupled to the first rotary link.

4. The gravity compensator according to claim 1, wherein the elastic body includes a plurality of elastic bodies, which are oriented in a direction perpendicular to the longitudinal direction of the first link, and wherein the gravity compensator further comprises an elastic-body link, which is coupled at a first side thereof to the second side of the elastic body and is rotatably coupled at a second side thereof to the first link.

5. The gravity compensator according to claim 1, wherein a torque, which is applied to the second link by elastic force of the elastic body, gradually increases and then decreases as the second link is rotated upwards with respect to the first link.

6. The gravity compensator according to claim 5, wherein the second link is rotatable in an up-and-down direction with respect to the first link, and is rotatable only between a first predetermined angle and a second predetermined angle, and wherein the torque applied to the second link is maximized at a third predetermined angle between the first predetermined angle and the second predetermined angle.

7. The gravity compensator according to claim 5, wherein the first body portion corresponds to the wearer's shoulder, and the second body portion corresponds to an upper arm rotatably connected to the wearer's shoulder.

8. The gravity compensator according to claim 1, wherein the connection unit includes a second wire, which is coupled at a first side thereof to the first rotator and extends in the longitudinal direction of the first link and which is connected to the second side of the elastic body so as to be moved by rotation of the first rotator.

9. The gravity compensator according to claim 8, wherein the connection unit includes a pulley, which is rotatably coupled to the second side of the elastic body and which is positioned between the first side and a second side of the second wire such that the second wire is wound around the pulley, and wherein the second side of the second wire extends in a reverse direction from a location at which the second wire is wound around the pulley, and is fixed to the first link.

10. The gravity compensator according to claim 1, wherein a torque, which is applied to the second link by elastic force of the elastic body, gradually increases as the second link is rotated upwards with respect to the first link.

11. The gravity compensator according to claim 10, wherein the first body portion corresponds to the wearer's upper arm, and the second body portion corresponds to a front arm rotatably connected to the wearer's upper arm.

* * * * *